No. 637,351. Patented Nov. 21, 1899.
T. C. SARGEANT.
MANURE DISTRIBUTER.
(Application filed July 15, 1899.)
(No Model.) 2 Sheets—Sheet 1.

WITNESSES. INVENTOR.

No. 637,351. Patented Nov. 21, 1899.
T. C. SARGEANT.
MANURE DISTRIBUTER.
(Application filed July 15, 1899.)

(No Model.) 2 Sheets—Sheet 2.

WITNESSES. INVENTOR.

UNITED STATES PATENT OFFICE.

THOMAS CHARLES SARGEANT, OF NORTHAMPTON, ENGLAND.

MANURE-DISTRIBUTER.

SPECIFICATION forming part of Letters Patent No. 637,351, dated November 21, 1899.

Application filed July 15, 1899. Serial No. 723,960. (No model.)

*To all whom it may concern:*

Be it known that I, THOMAS CHARLES SARGEANT, a subject of Her Majesty the Queen of Great Britain, residing at Northampton, England, have invented a certain new and useful Improvement in Manure-Distributers, of which the following is a specification.

My invention relates to an improvement in the means for operating the drum or shield and hopper of a type of distributer described in the specification of my British Letters Patent No. 24,537, dated October 23, 1897, in which the hopper and outside of the drum or shield are brought into such a position when filling with manure that such outer wall of the drum or shield forms the fourth side of the hopper, so that the manure receives the shape of the curved face, said hopper being afterward lowered and the drum or shield partly rotated, so that the spreader wheels or arms carried by the shield can be brought into contact with the manure in its curved form as soon as the vehicle starts, as the hopper is then gradually raised by chains passing over pulleys, so as to keep the material constantly in contact with the spreader-wheels.

The object of the present invention is to be able to effect the movements required for bringing the hopper into the filling position and lowering it into the position in which it is ready to start the distributing by one movement of a lever for each operation, the means for keeping the hopper subsequently drawn up by the chains and pulleys forming no part of my present invention. These movements of raising and lowering the hopper and moving or rotating the shield have hitherto been done separately, with the result that should by accident the movement of rotation of the shield or drum be done first the manure is deprived of its support in the hopper on one side and will all fall through onto the ground.

According to my invention the parts are so arranged that the movements are timed in their proper order, and each is effected from a single point by a lever or hand-wheel.

Figure 1:
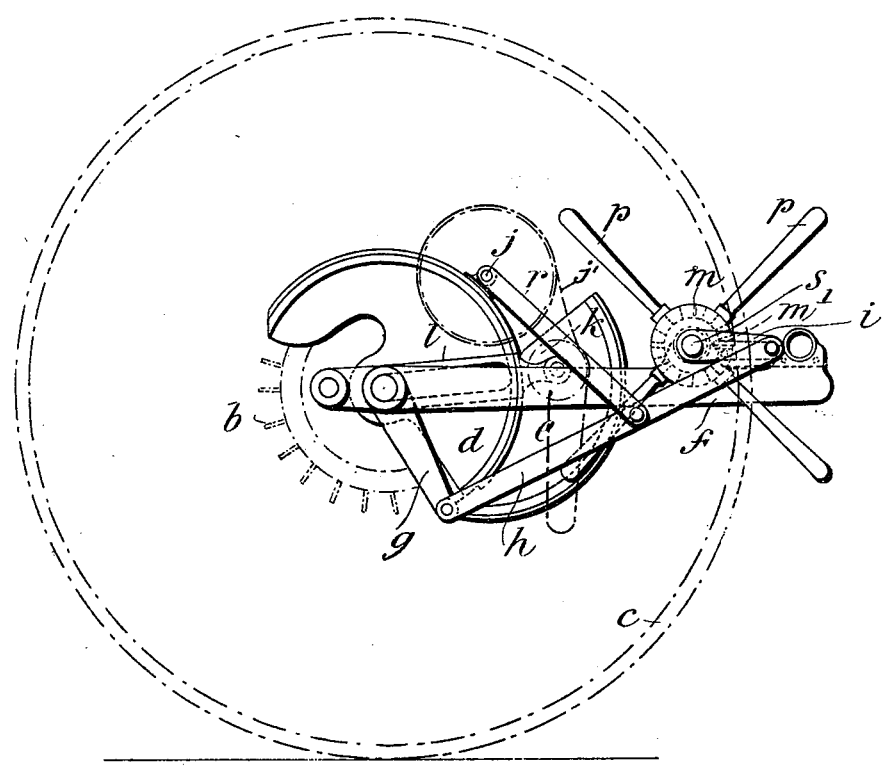
Figure 2:
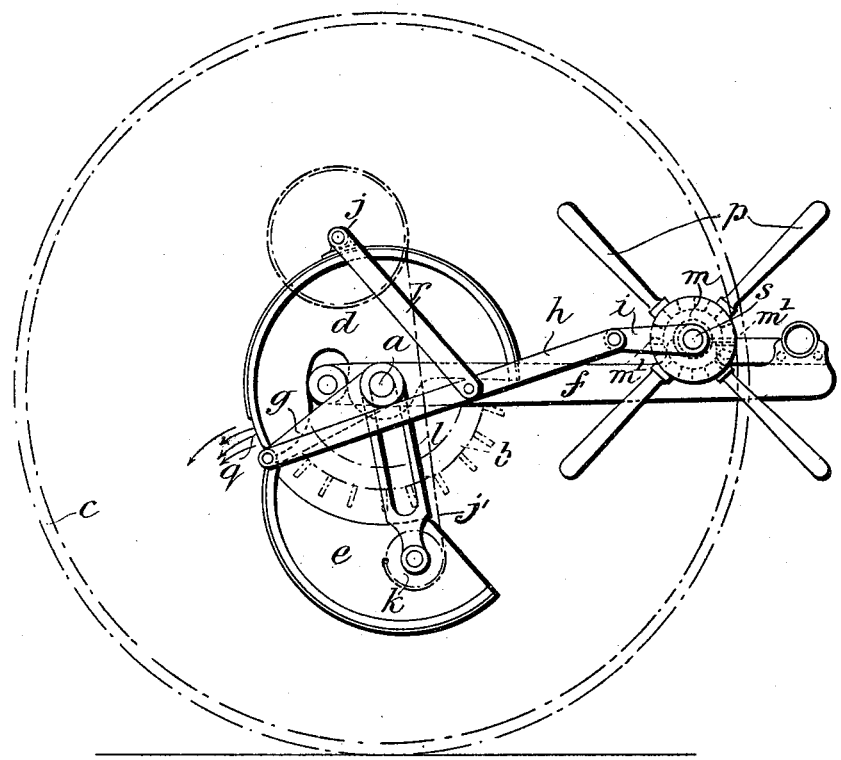
Figure 3:
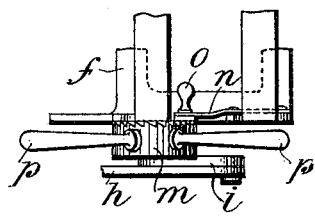

In the accompanying drawings, Figure 1 is a side elevation of sufficient of a distributer to illustrate my invention. Fig. 2 is a similar view with the parts in another position, and Fig. 3 is a plan of the operating hand-wheel.

$a$ is the axle of the vehicle, on which are mounted the spreader-wheels $b$, which are driven by the movement of the vehicle-wheels $c$.

$d$ is the shield or drum, and $e$ is the hopper. The axle $a$ is carried by a frame $f$, to which the shafts are attached. To the axle $a$ I hang an arm or lever $g$, which is loose on same, but is pivoted to the lowest point of hopper $e$. To said arm is attached a link $h$, fixed to a crank $i$ on a shaft $s$, supported by the frame and capable of turning thereon. To the link $h$ is pivoted about midway a second link $r$, pivoted in turn to the outside of the shield or drum $d$, and preferably to the shaft $j$, which forms part of the mechanism for operating the chain $j'$ for raising the hopper when distributing, as in my British Patent No. 24,537, hereinbefore referred to, one of the points to which such chain is attached being indicated at $k$ as a stud, to which is attached a slotted guide-link $l$, which surrounds the axle $a$ and acts as a guide for the hopper when it is being closed up during the distributing. These parts $j\,j'\,k\,l$, however, form no part of my present invention. The crank $i$ is connected solidly with a disk $m$, Fig. 3, which has ratchet-teeth formed on the inside, together with two stop-notches $m'\,m'$, if desired, to mark the different positions. A spring-pawl $n$, controlled by a handle $o$, engages with these teeth, so that the disk may only be turned (which is done by its handles $p$) in one direction. The pawl, however, may be arranged to fall completely into the stop-notches $m'\,m'$, so that it will have to be lifted out by the handle $o$ before the ratchet can be turned so that the two positions of the parts are marked by these notches, which enables it to be known when the parts have been moved sufficiently far.

In Fig. 1 the parts are in their filling position, the manure being thrown into the open top of the hopper $e$ and receiving a curved shape from the other side of the drum or shield $d$. The handle $p$ being turned, the link $h$ is moved in a rearward direction, rotating the arm $g$ and hopper $e$ until the latter falls downward on its guiding-link $l$ into its feeding position, as shown in Fig. 2. The movement of link $h$ exerts no effect on link $r$ while link $h$ is moving downwardly, so that the drum $d$ is not moved in the first instance, except it be, perhaps, very slightly upward; but as soon as arm $g$ passes the vertical position and commences to rise the links $h$ and $r$ are quickly raised, thus rotating through the latter the drum or shield $d$ and bringing it into the position shown in Fig. 2, where it will be seen that it has fully exposed the spreader-wheels $b$, so that they are enabled to act on the contents of the hopper as the latter is drawn up and throw it through the opening $q$ left between the lower edge of the drum and the upper edge of the hopper. It will be understood that there is a corresponding arrangement of links and levers on each end of the machine. By this arrangement of parts it will be seen that it is impossible for the drum to be moved first, thus taking away the support for the manure in the hopper, while the movement just described takes place with one movement of a handle, while a continuous onward movement of the handle will bring all the parts back to their original position.

What I claim is—

1. In a manure-distributer, and in combination, a shield having a curved face, spreading devices therein, a movable hopper, one side of which is formed in its filling position by said curved face of the shield, means for moving said hopper from its filling position to its feeding position and for subsequently and as part of the operation moving said shield to expose the spreading device, and a handle for operating said means, substantially as described.

2. In a manure-distributer, the combination with a shield, spreading devices therein, and a hopper capable of a radial movement around the shield, of a lever pivotally hung at the center of the shield and carrying the hopper, a crank, a link connecting said lever and crank, a second link connected to the first and to the shield, means for carrying the crank and means for rotating same whereby the hopper may be first moved from its filling position and the shield next moved to expose the spreading devices substantially as described.

In testimony whereof I have hereunto set my hand in the presence of two subscribing witnesses.

THOMAS CHARLES SARGEANT.

Witnesses:
RALPH W. GARDNER,
H. RUSSELL SMITH.